United States Patent [19]

Kay

[11] B 3,985,706

[45] Oct. 12, 1976

[54] SMOKE-RETARDANT FOR CHLORINATED POLYETHYLENE AND VINYL CHLORIDE POLYMERS

[75] Inventor: Edward L. Kay, Akron, Ohio

[73] Assignee: The Firestone Tire & Rubber Company, Akron, Ohio

[22] Filed: Mar. 24, 1975

[21] Appl. No.: 561,387

[44] Published under the second Trial Voluntary Protest Program on February 10, 1976 as document No. B 561,387.

[52] U.S. Cl. ..................... 260/45.75 W; 260/42.47; 260/42.49; 260/45.7 R
[51] Int. Cl.² ............................................ C08J 3/20
[58] Field of Search ............... 260/45.75 W, 45.7 R, 260/42.47, 42.49

[56] References Cited
UNITED STATES PATENTS

| | | | |
|---|---|---|---|
| 3,524,761 | 8/1970 | Humphrey | 260/45.75 W |
| 3,869,420 | 3/1975 | Mathis et al. | 260/45.7 R |

OTHER PUBLICATIONS

Fire and Flammability Series – vol. 7 – Flammability of Solid Plastics (1974), pp. 251–275.

Primary Examiner—V.P. Hoke

[57] ABSTRACT

The invention relates to additives for chlorine-containing polymer compositions.

Much has been published on flame retardants, to prevent or limit combustion of products made from such polymers, although the visible smoke is considered highly detrimental, particularly with respect to ability of persons to find an exit in a burning structure or the ability of firemen to see and extinguish a fire. The process relates to the use of a synergistic combination of aluminum oxide trihydrate and zinc borate for reducing or eliminating smoke from the combustion of chlorine-containing polymer which may be any polyvinyl chloride or any chlorinated polyethylene or polypropylene, etc.

5 Claims, No Drawings

SMOKE-RETARDANT FOR CHLORINATED POLYETHYLENE AND VINYL CHLORIDE POLYMERS

PRIOR ART

There is much art on flame-retardants, but little on smoke-retarders or suppressants.

The use of aluminum oxide trihydrate ($Al_2O_3 \cdot 3H_2O$) and zinc borate ($2ZnO \cdot 3B_2O_3 \cdot 3.5\ H_2O$) as flame-retardants is well known in the industry. For the sake of brevity, $Al_2O_3 \cdot 3H_2O$ is abbreviated as AlTH and zinc borate as Zn borate.

Patents on smoke retardants include, for example, Frisch U.S. Pat. No. 3,725,319 and Doerge et al. U.S. Pat. Nos. 3,746,664 and 3,758,638, but these include no suggestion of the invention.

A paper entitled SMOKE GENERATION FROM THE BURNING OF SOME POLYMERIC MATERIALS by Brauman et al., given at the 32nd Annual Technical Conference of the Society of Plastic Engineers held in San Francisco in May 1974 discusses the problem and the effect of several smoke deterrents, but does not suggest the invention.

An article on pages 42 and 47 of PLASTICS TECHNOLOGY for July 1974 refers to alumina trihydrate and zinc borate as reducing smoke, but applicant's invention is of prior date.

SUMMARY OF THE INVENTION

It has been found that AlTH and Zn borate, used in combination, are very effective smoke suppressants when added to chlorine-containing polymers, including chlorinated polyethylene and propylene, etc., and especially vinyl chloride. The chlorine content of polyvinyl chloride is about 57 per cent. If copolymers of vinyl chloride are used, the chlorine content is less if the comonomer (such as vinyl acetate) does not contain chlorine, and is higher if the comonomer contains chlorine (such as vinylidene chloride). The chlorine content of chlorinated polyethylene or chlorinated polypropylene may vary over a wide range depending upon the physical properties of the polymer. Generally, a range of 5 to 40 per cent chlorine is present. The chlorine content of a flexible polyvinyl chloride composition will generally be less than 57 per cent since non-chlorinated plasticizer is generally present. Thus, the chlorine-content of the polymer may range from 10 to 75 per cent. The AlTH and Zn borate synergistically retard and lessen the smoke generated by the burning polymer. One may use 1 to 5 parts by weight (and preferably substantially 5 parts) of Zn borate or up to 25 parts or more, if desired, together with 6 to 30 or more parts by weight of aluminum trihydrate ($Al_2O_3 \cdot 3H_2O$) up to 150 parts or more, if desired, per 100 parts of the polymer.

Before referring to the results it is advantageous to know the meaning of the terms utilized. Definitions follow.

NATIONAL BUREAU OF STANDARDS SMOKE DENSITY CHAMBER

Evaluations for the density of visible smoke were made using a commercial smoke density chamber modeled after one developed at the National Bureau of Standards by the Fire Research Group (see D. Gross, J. J. Loftus and A. F. Robertson, ASTM Special Technical Publication 422 pages 166–204 (1969).) This chamber contains a radiant heater producing 2.5 $W/cm^2$ of heat at the surface of a 3 inches $\times$ 3 inches sample, a propane-air pilot burner and a vertical beam of light with a photomultiplier tube detector and microphotometer to record the attenuation of light by smoke developing in the chamber. During smoke testing, the chamber is sealed to enclose the combustion products and smoke. The smoke developed is measured as Specific Optical Density, $D_S$, where $$D_S = \frac{V}{AL} \log_{10} \frac{T_o}{T} = 132 \log_{10} \frac{T_o}{T}$$

$V$ = volume of chamber
$A$ = area of test specimen
$L$ = length of light path
$T_o$ = initial light transmittance through the chamber
$T$ = transmittance of light during test.

At the peak of smoke build-up $D_S = D_m$, and for purposes of the report, corrected maximum smoke is recorded as $D_{mc} = D_m - D_c$ where $D_c$ is the clear beam specific optical density occurring after the smoke test, when the chamber has been exhausted of smoke. Lower values of $D_{mc}$ indicate less obscuration of light due to smoke.

Several other quantities measured include the time in minutes to 90 per cent of $D_m$ ($t\ 0.9\ D_m$) and the time (in minutes) to $D_S = 16$ ($t\ D_{16}$), which are indicative of the rate of smoke development (higher numbers signify slower rates), as well as the smoke obscuration number for the first four minutes of test, $SON_4$, where $$SON_4 = \frac{D_S(1\ min.) + D_S(2\ min.) + D_S(3\ min.) + D_S(4\ min.)}{4}$$

which also represents the early rate of smoke development (lower numbers mean less smoke). The definitions of terms are summarized below.

$D_{mc}$ = Specific optical density at maximum smoke intensity, corrected for fogging of lens seals. $D_{mc} <$ 25, light; 25–75, moderate; 100–400, dense; $>$ 400 very dense.

$t\ 0.9\ D_m$ = time (minutes) to reach 90 per cent of maximum optical density.

$tD_{16}$ = time (minutes) to $D = 16$; corresponds to early visibility obscuration. $tD_{16} < 1$, very fast; 1–3 fast; 4–6 moderate; 7–10, slow; $> 10$, very slow smoker.

$SON_4$ = Smoke obscuration number over first four minutes of test $$\{(\Sigma = D_t)/4\}_{t=1}^{4}$$

indicates amount of smoke vs. rate of build-up early in the test. $SON_4 < 3$, very low; 4–10, low; 10–50, moderate; 50–100, high; $> 200$, very high.

LOI is the abbreviation for Limiting Oxygen Index which is defined as the minimum mole per cent oxygen content required in an oxygen/nitrogen mixture to maintain combustion of a vertical, top-lighted test specimen. The value is expressed in mathematical terms as follows:

$$LOI = \frac{[O_2]}{[O_2] + [N_2]} \times 100$$

where [$O_2$] is the concentration of oxygen and [$N_2$] is the concentration of nitrogen. The LOI is considered to be an accurate, reproducible determination of the flammability of materials. From a practical standpoint, an LOI value of greater than 25 generally means that the test specimen will be self-extinguishing. For a more detailed discussion of the LOI and method of determination, C. P. Fenimore and F. I. Martin's article in COMBUSTION AND FLAME 10 No. 2, page 135 (1966), should be consulted.

Limiting Oxygen Indices were obtained using the Michigan Chemical LOI apparatus. An Amico-NBS smoke density chamber was used to obtain data on the rate of smoke generation as well as intensity of visible smoke.

EXPERIMENTAL RESULTS

As background information, zinc borate was evaluated as a flame retardant and smoke suppressant in ABS, Dienite and rigid PVC resins. The Dienite used was a homopolymer of butadiene with a content of over 90 per cent by weight of units of 1,2-configuration. The experimental results are summarized in Table I.

The so-called flexible and rigid PVC are distinguished by the fact that the former contains plasticizer, which in the tests was plasticizer which contained no chlorine.

Relative to flammability, it will be noted that zinc borate had no significant effect on the LOI of either ABS or Dienite. However, the LOI of the rigid PVC sample was increased from 42.9 to 52.2 which confirms a beneficial effect and also substantiates why zinc borate is recommended as a partial replacement of antimony oxide in PVC polymers.

Referring to the $D_{mc}$ values in Table I, it will be noted that zinc borate apparently functions in a manner to increase maximum smoke intensity in the ABS system and has a slight decreasing smoke intensity effect in the Dienite system although at a 5.0 phr level, the $D_{mc}$ values are essentially equivalent. It is noted that in rigid PVC, the zinc borate is shown to increase slightly the maximum smoke intensity.

As far as the rate of smoke generation is concerned, zinc borate has little effect on decreasing the rate of smoke generation (increase in the $t.09D_m$ and $tD_{16}$ values) of ABS, Dienite or rigid PVC systems although at a 10.0 phr level of zinc borate; a significant decrease in rate of smoke generation is noted in the Dienite system.

Based on the data in Table I, zinc borate would be expected to increase the LOI of rigid PVC (and perhaps other chlorinated polymers) but would not be expected to decrease the maximum smoke intensity of rigid PVC or delay the rate of smoke generation in that polymer or other polymers.

Therefore, it was unexpected that zinc borate, in combination with AlTH in rigid PVC, not only functioned as a flame retardant but also as a smoke suppressant. The unexpected results are summarized in Table II.

TABLE I

EFFECT OF ZINC BORATE[1] ON FLAMMABILITY AND SMOKE GENERATION PROPERTIES OF VARIOUS POLYMERS

| | | | NBS SMOKE CHAMBER, FLAMING EXPOSURE | | | |
|---|---|---|---|---|---|---|
| POLYMER | ADDITIVE; phr | LOI | $D_{mc}$ | $t.9D_m$ | tD16 | $SON_4$ |
| 1. ABS[2] | — | 19.5 | 527 | 1.5 | 0.45 | 507 |
| 2. ABS[2] | Zinc Borate; 2.0 | 20.0 | 555 | 1.7 | 0.48 | 497 |
| 3. ABS[2] | Zinc Borate; 5.0 | 19.5 | 578 | 1.8 | 0.46 | 567 |
| 4. Dienite[3] | — | 24.5 | 275 | 1.6 | 0.84 | 234 |
| 5. Dienite[3] | Zinc Borate; 5.0 | 24.5 | 272 | 1.6 | 0.85 | 234 |
| 6. Dienite[3] | Zinc Borate; 10.0 | 24.5 | 263 | 2.9 | 1.22 | 178 |
| 7. Dienite[3] | Zinc Borate; 20.0 | 24.5 | 225 | 1.7 | 0.87 | 188 |
| 8. Rigid PVC[4] | — | 42.9 | 410 | 2.8 | 0.5 | 307 |
| 9. Rigid PVC[4] | Zinc Borate; 0.1 | 44.9 | 472 | 2.8 | 0.5 | 358 |
| 10. Rigid PVC[4] | Zinc Borate; 5.0 | 52.2 | 429 | 2.8 | 0.45 | 317 |

[1]Zinc borate is nominally $2ZnO.3B_2O_3.3.5 H_2O$ obtained from U.S. Borax, trade name FIREBRAKE ZB.
[2]ABS is an acrylonitrile/butadiene/styrene polymer obtained from Marbon Chemical, a division of Borg Warner Co., under the trade name CYCOLAC H 1100.
[3]Dienite is a silica-filled polybutadiene resin having a high 1,2-structure obtainable from Firestone Tire & Rubber Company.
[4]Rigid PVC is obtainable from Firestone Tire & Rubber Company (Firestone Plastics Co.) under the trade name FPC-965.

TABLE II

RIGID PVC[1] CONTAINING SYNERGISTIC COMBINATIONS OF ZINC BORATE[2]/AlTH[3]

| | | NBS SMOKE CHAMBER, FLAMING EXPOSURE | | | |
|---|---|---|---|---|---|
| POLYMER | ADDITIVE; phr | LOI | $D_{mc}$ | $t.9D_m$ | $tD_{16}$ | $SON_4$ |
| 1. Rigid PVC | — | 42.0 | 563 | 3.30 | 0.47 | 397 |
| 2. Rigid PVC | AlTH; 30.0 | 49.0 | 460 | 3.65 | 0.57 | 291 |
| 3. Rigid PVC | Zinc Borate; 5.0 | ca. 52 | >563 | ca. 3.3 | ca. 47 | ca. >397 |
| 4. Rigid PVC | AlTH; 30.0 plus Zinc Borate; 5.0 | 59 | 285 | 4.29 | 0.65 | 157 |
| Expected values for Sample No. 4 | | 59 | >460 | 3.65 | 0.57 | 291 |

[1]Rigid PVC is a product of Firestone Plastics Co., designated FPC-965.
[2]Zinc borate is $2ZnO.3B_2O_3.3.5 H_2O$ obtained from U.S. Borax under the trade name FIREBRAKE ZB.
[3]AlTH is nominally $Al_2O_3.3H_2O$ obtained from ALCOA.

As shown by the data in Table II, 30.0 phr of AlTH increased the LOI of the rigid PVC from 42.0 to 49.0. Zinc borate, based on data in Table I, would be expected to increase the LOI from 42.0 to about 52. Apparently AlTH and zinc borate affect the LOI value in an additive manner. Thus, AlTH should increase the LOI of the base rigid PVC polymer by 7 units and zinc borate by 10 units, or the additive effect should be an increase of 17 LOI units to a predicted value of 59 which was observed experimentally. No synergistic effect on flammability was observed.

Relative to maximum smoke intensity, the $D_{mc}$ value of the rigid PVC is decreased from 563 to 460 as The rate of smoke generation of the AlTH/zinc borate/ rigid PVC is also unexpectedly low (compare $t$ $0.9D_m$ and $tD_{16}$ values) compared to the expected values assuming that the effects of AlTH and zinc borate are additive.

The synergistic effect of AlTH and zinc borate on reducing the maximum smoke intensity of chlorinated PE is shown by the data recorded in Table III.

TABLE III

CHLORINATED PE[1] CONTAINING SYNERGISTIC COMBINATIONS OF ZINC BORATE[2]/AlTH[3]

| POLYMER | ADDITIVE; phr | LOI | NBS SMOKE CHAMBER, FLAMING EXPOSURE | | | |
|---|---|---|---|---|---|---|
| | | | $D_{mc}$ | $t.9D_m$ | $tD_{16}$ | $SON_4$ |
| 1. Chlorinated PE | — | 27.0 | 707 | 2.33 | 0.60 | 542 |
| 2. Chlorinated PE | Zinc Borate; 5.0 | 28.0 | 685 | 3.17 | 0.62 | 461 |
| 3. Chlorinated PE | AlTH; 30.0 | 27.5 | 470 | 3.05 | 0.78 | 333 |
| 4. Chlorinated PE | Zinc Borate; 5.0 plus AlTH; 30.0 | 30.5 | 347 | 3.83 | 0.64 | 215 |
| Expected values for Sample No. 4 | | 28.5 | 448 | 3.89 | 0.80 | 262 |

[1]Dow chlorinated polyethylene designated MX5325.01 contains nominally 36% chlorine.
[2]Zinc borate is nominally $2ZnO.3B_2O_3. 3.5 H_2O$ obtained from U.S. Borax under the trade name FIREBRAKE ZB.
[3]AlTH is nominally $Al_2O_3.3H_2O$ obtained from ALCOA.

shown. The expected effect of zinc borate would be to slightly increase the $D_{mc}$ value for rigid PVC containing 30.0 phr AlTH and 5.0 phr zinc borate is greater than 460. Unexpectedly, the observed value is 285 which is considered a significant reduction.

In order to more clearly present the synergistic effect of AlTH in combination with zinc borate, the following detailed calculations are presented:

CHARGE IN $D_{mc}$ PER

| | $D_{mc}$ | ONE phr OF ADDITIVE |
|---|---|---|
| Rigid PVC | 563 | — |
| Rigid PVC plus 30.0 phr AlTH | 460 | 103/30=3.4 reduction |
| Rigid PVC plus 5.0 phr Zn borate (Table I) | 429 | 19/5 =3.8 increase |
| Predicted $D_{mc}$ of Rigid PVC plus 30.0 phr AlTH/5.0 Zn borate: 563 plus (5.0×3.8) minus (30×3.4)=480 $D_{mc}$ | | |

Thus, comparing an expected 480 $D_{mc}$ (or <460 $D_{mc}$) with the experimental 285 $D_{mc}$ value, it is clearly shown that the combination of AlTH and zinc borate unexpectedly interact in a manner which has a significant beneficial effect on maximum smoke intensity. By similar calculations the expected values for rate of smoke generation can be determined.

Specifically, the expected $D_{mc}$ value of the system is expected to be 448 in contrast to the 347 observed value. No synergistic effect of AlTH/zinc borate is shown on the rate of smoke generation; actually, the observed rate of smoke generation is greater than the expected value.

Data in Table IV demonstrate that the combination of AlTH and zinc borate is also effective as a smoke retardant in so-called flexible PVC which contains plasticizers.

TABLE IV

FLEXIBLE PVC[1] PLUS ZINC BORATE[2]/AlTH[3]

| POLYMER | ADDITIVE | LOI | NBS SMOKE CHAMBER FLAMING EXPOSURE | | | |
|---|---|---|---|---|---|---|
| | | | $D_{mc}$ | $t.9D_m$ | $tD_{16}$ | $SON_4$ |
| 1. Flexible PVC | — | 24.5 | 483 | 2.91 | 0.27 | 433 |
| 2. Flexible PVC | Zinc Borate; 5.0 plus AlTH; 30 phr | 26.5 | 349 | 2.37 | 0.27 | 299 |

[1]Flexible PVC obtainable from Firestone Plastics Co., designated FPC-9339.
[2]Zinc borate is nominally $2ZnO.3B_2O_3. 3.5 H_2O$ obtained from U.S. Borax under the trade name FIREBRAKE ZB.
[3]AlTH is nominally $Al_2O_3.3H_2O$ obtained from ALCOA.

I claim:

1. A polymer composition of the class consisting of chlorinated polyethylene and polyvinyl chloride which polymer has a chlorine content of 10 to 75 per cent and is compounded with 1 to 25 parts of zinc borate ($2ZnO.3B_2O_3. 3.5 H_2O$) and 6 to 150 parts of $Al_2O_3.3H_2O$ which act synergistically as a smoke suppressant when the polymer composition is burned.

2. The polymer composition of claim 1 which contains 1 to 5 parts of said zinc borate and 6 to 30 parts of said aluminum oxide.

3. The composition of claim 1 in which the polymer is chlorinated polyethylene.

4. The composition of claim 1 in which the polymer is rigid polyvinylchloride.

5. The composition of claim 1 in which the polymer is flexible polyvinylchloride.

* * * * *

UNITED STATES PATENT OFFICE
CERTIFICATE OF CORRECTION

Patent No. 3,985,706           Dated October 12, 1976

Inventor(s) Edward L. Kay

It is certified that error appears in the above-identified patent and that said Letters Patent are hereby corrected as shown below:

In Column 1, Line 2, "$(Al_2O_3O3H_2O)$" should read --$(Al_2O_3 \cdot 3H_2O)$--.

In Column 1, Line 10, "$(2ZnO \cdot 3B_2O_3O3.5 \; H_2O)$" should read --$(2ZnO \cdot 3B_2O_3 \cdot 3.5 \; H_2O$ --.

In Column 1, Line 54, "$(Al_2O_3O3-$" should read --$(Al_2O_3 \cdot 3-$ --

In Column 2, Line 54-55, "$\left\{ (\Sigma \equiv D_t)/4 \right\}_{t=1}^{4}$" should read --$\left\{ \equiv (\Sigma D_t)/4 \right\}_{t=1}^{4}$ --

In Column 4, Line 13, "$t.09Dm$" should read --$t.9Dm$--

Signed and Sealed this

First Day of February 1977

[SEAL]

Attest:

RUTH C. MASON
*Attesting Officer*

C. MARSHALL DANN
*Commissioner of Patents and Trademarks*